US009265022B2

(12) United States Patent
Gupta et al.

(10) Patent No.: US 9,265,022 B2
(45) Date of Patent: Feb. 16, 2016

(54) MULTIPLE REGISTRATIONS WITH DIFFERENT ACCESS NETWORKS

(75) Inventors: Kirti Gupta, San Diego, CA (US); Manoj M. Deshpande, San Diego, CA (US); Ranjith Jayaram, San Diego, CA (US); Arnaud Meylan, San Diego, CA (US); Sanjiv Nanda, Ramona, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1022 days.

(21) Appl. No.: 11/445,741

(22) Filed: Jun. 2, 2006

(65) Prior Publication Data

US 2007/0280154 A1  Dec. 6, 2007

(51) Int. Cl.
*H04W 60/00* (2009.01)
*H04W 88/06* (2009.01)
*H04W 76/02* (2009.01)
*H04W 8/04* (2009.01)
*H04W 80/04* (2009.01)

(52) U.S. Cl.
CPC .............. *H04W 60/005* (2013.01); *H04W 8/04* (2013.01); *H04W 76/025* (2013.01); *H04W 80/04* (2013.01); *H04W 88/06* (2013.01)

(58) Field of Classification Search
USPC .................................................. 370/328, 338
See application file for complete search history.

(56) References Cited

U.S. PATENT DOCUMENTS

| | | | |
|---|---|---|---|
| 6,850,503 B2 * | 2/2005 | Dorenbosch et al. | 370/331 |
| 2001/0028660 A1 * | 10/2001 | Carolan et al. | 370/466 |
| 2002/0154627 A1 * | 10/2002 | Abrol et al. | 370/352 |
| 2004/0193712 A1 * | 9/2004 | Benenati et al. | 709/225 |
| 2004/0219948 A1 * | 11/2004 | Jones et al. | 455/552.1 |
| 2005/0083846 A1 * | 4/2005 | Bahl | 370/236 |
| 2005/0083899 A1 * | 4/2005 | Babbar et al. | 370/342 |
| 2005/0117514 A1 | 6/2005 | Iwata et al. | |
| 2005/0117546 A1 * | 6/2005 | Lioy et al. | 370/332 |
| 2005/0117591 A1 * | 6/2005 | Hurtta | H04L 29/12273 370/401 |
| 2005/0198506 A1 * | 9/2005 | Qi et al. | 713/170 |
| 2005/0226197 A1 * | 10/2005 | Reddy | H04L 29/12311 370/338 |
| 2005/0227692 A1 * | 10/2005 | Kawashima et al. | 455/435.2 |
| 2005/0266880 A1 * | 12/2005 | Gupta et al. | 455/557 |
| 2006/0059341 A1 * | 3/2006 | Dharmadhikari et al. | 713/168 |
| 2006/0148512 A1 * | 7/2006 | Ekholm et al. | 455/550.1 |
| 2006/0222009 A1 * | 10/2006 | Yao et al. | 370/469 |
| 2006/0229078 A1 * | 10/2006 | Itzkovitz | H04L 29/06027 455/445 |
| 2006/0293028 A1 * | 12/2006 | Gadamsetty et al. | 455/411 |
| 2007/0019545 A1 * | 1/2007 | Alt et al. | 370/230 |
| 2007/0032251 A1 * | 2/2007 | Shaheen | 455/466 |
| 2007/0109990 A1 * | 5/2007 | Bennett | 370/328 |
| 2007/0253359 A1 * | 11/2007 | Hall et al. | 370/328 |

* cited by examiner

*Primary Examiner* — Ashley Shivers
(74) *Attorney, Agent, or Firm* — Larry Moskowitz

(57) ABSTRACT

The disclosure is directed to a mobile communication device that is capable of accessing different types of networks at the same time. The mobile device registers a public ID with a first IP address over a first access network and also registers the same public ID with a different IP address over a second access network. Additional registrations and IP addresses may occur as well. Of particular benefit is that the different registrations are active during at least some concurrent period of time. This allows a user of the mobile device to have improved continuity of service, select preferred access methods, and receive different data services simultaneously.

45 Claims, 4 Drawing Sheets

MULTIPLE REGISTRATIONS WITH DIFFERENT ACCESS NETWORKS

BACKGROUND

1. Field

The present disclosure relates generally to telecommunications, and more particularly, to systems and methods to support a mobile communications device capable of communicating via two different types of communication networks.

2. Background

The demand for wireless information services has led to the development of an ever increasing number of wireless networks. CDMA2000 1x is just one example of a wireless network that provides wide area telephony and data services. CDMA2000 1x is a wireless standard promulgated by the Third Generation Partnership Project 2 (3GPP2) using code division multiple access (CDMA) technology. CDMA is a technology that allows multiple users to share a common communications medium using spread-spectrum processing. A competing wireless network that is commonly employed in Europe is Global System for Mobile Communications (GSM). Unlike CDMA2000 1x, GSM uses narrowband time division multiple access (TDMA) to support wireless telephony and data services. Some other wireless networks include General Packet Radio Service (GPRS) which supports high speed data services with data rates suitable for e-mail and web browsing applications, and Universal Mobile Telecommunications System (UMTS) which can deliver broadband voice and data for audio and video applications. Other access technologies include EV-DO and High-Speed Downlink Packet Access (HSDPA).

These wireless networks can generally be thought of as wide area networks employing cellular technology. Cellular technology is based on a topology in which the geographic coverage region is broken up into cells. Within each of these cells is a fixed base transceiver station (BTS) that communicates with mobile users. A base station controller (BSC) is typically employed in the geographic coverage region to control the BTSs and route communications to the appropriate gateways for the various packet-switched and circuit-switched networks.

As the demand for wireless information services continue to increase, mobile devices are evolving to support integrated voice, data, and streaming media while providing seamless network coverage between wide area cellular networks and wireless local area networks (LAN). Wireless LANs generally provide telephony and data services over relatively small geographic regions using a standard protocol, such as IEEE 802.11, or the like. The existence of wireless LANs provides a unique opportunity to increase user capacity in a wide area cellular network by extending cellular communications to the unlicensed spectrum using the infrastructure of the wireless LAN.

Recently, various techniques have been employed to enable mobile devices to communicate with different wireless networks. Accordingly, mobile devices may benefit from being able to communicate with multiple networks at the same time. Thus, there exists the need to allow such communications to take place in a seamless manner that satisfies users' requirements for speed, economy, efficiency, and capabilities.

SUMMARY

In a first aspect, a method for exchanging respective data over multiple access networks is presented. According to this method a public identity of a user associated with a device is registered with a first IP address using a user credential; and the public identity of the user is also registered with a second IP address using the same credential while maintaining the registration of the first IP address with the public identity.

In another aspect, a mobile device that includes a first transceiver for exchanging first data over a first type of access network, a second transceiver for exchanging second data over a second type of access network; and a user credential is presented. The device also includes a processor configured to execute instructions to a) transmit the user credential to an IP network in order to register a public identity with a first IP address associated with the first type of access network; and b) transmit the same user credential to the IP network in order to register the public identity with a second IP address associated with the second type of access network, wherein the registration of the first IP address and the registration of the second IP address with the public identity are active at the same time.

In yet another aspect, a method of providing continuity of services using a mobile device capable of exchanging respective data over multiple access networks is presented. This method includes registering a public identity of a user associated with a device with a first IP address using a user credential and registering the public identity with a second IP address using the same credential while maintaining the registration of the first IP address with the public identity. Also, the method includes communicating with a data service using the first IP address and then terminating communicating with the data service using the first IP address. However, communicating with the data service continues using the second IP address without re-registering with the data service during or after terminating communicating using the first IP address.

In still a further aspect, a method of providing services over preferred access, for the services available to a mobile device capable of exchanging respective data over multiple access networks is presented. In accordance with this method, a public identity of a user associated with a device is registered with a first IP address using a user credential and the public identity of the user is also registered with a second IP address using the same credential while maintaining the registration of the first IP address with the public identity. Additionally, the mobile device uses the first IP address when communicating data over a first access network and the second IP address when communicating data over a second access network.

In an additional aspect, a method of providing concurrent access to data services using a mobile device capable of exchanging respective data over multiple access networks is presented. In accordance with this method a public identity of a user associated with a device is registered with a first IP address using a user credential and the public identity of the user is also registered with a second IP address using the same credential while maintaining the registration of the first IP address with the public identity. Also, a first data service is communicated with using the first IP address over a first access network while a second data service is communicated with using the second IP address over a second access network during at least a portion of the time that communicating with the first data service is occurring.

In one more aspect, a mobile device for exchanging respective data over multiple access networks is presented. In accordance with this aspect, the device includes a first transceiver for exchanging first data over a first type of access network and a second transceiver for exchanging second data over a second type of access network. Also included is a means for registering a public identity of a user associated with the mobile device with a first IP address using a user credential and registering the public identity of the user with a second IP address using the same credential while maintaining the registration of the first IP address with the public identity.

It is understood that other embodiments of the present invention will become readily apparent to those skilled in the art from the following detailed description, wherein it is shown and described only various embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Various aspects of a wireless communications system are illustrated by way of example, and not by way of limitation, in the accompanying drawings, wherein.

DETAILED DESCRIPTION

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

In the following detailed description, various techniques will be described in connection with the handoff of a mobile user from one network to another. A number of these techniques will be described in the context of a mobile communications device traveling through a wide area cellular network with one or more wireless LANs dispersed throughout the cellular coverage region. The mobile communications device may be any suitable device capable of wireless telephony or data communications, such as a cellular phone designed for operation in a CDMA2000 1x network. The mobile communications device may be capable of employing any suitable protocol for accessing a wireless LAN, including, by way of example, IEEE 802.11. While these techniques may be described in the context of a cellular phone capable of communicating with an IEEE 802.11 network, those skilled in the art will readily appreciate that these techniques can be extended to other mobile communication devices capable of accessing multiple networks. For instance, these techniques may be applied to a mobile communications device capable of switching between a CDMA2000 1x network and a GSM network. Accordingly, any reference to a cellular phone capable of communicating with an IEEE 802.11 network, or any other specific embodiment, is intended only to illustrate various aspects of the present invention, with the understanding that these aspects have a wide range of applications.

Figure 1A:
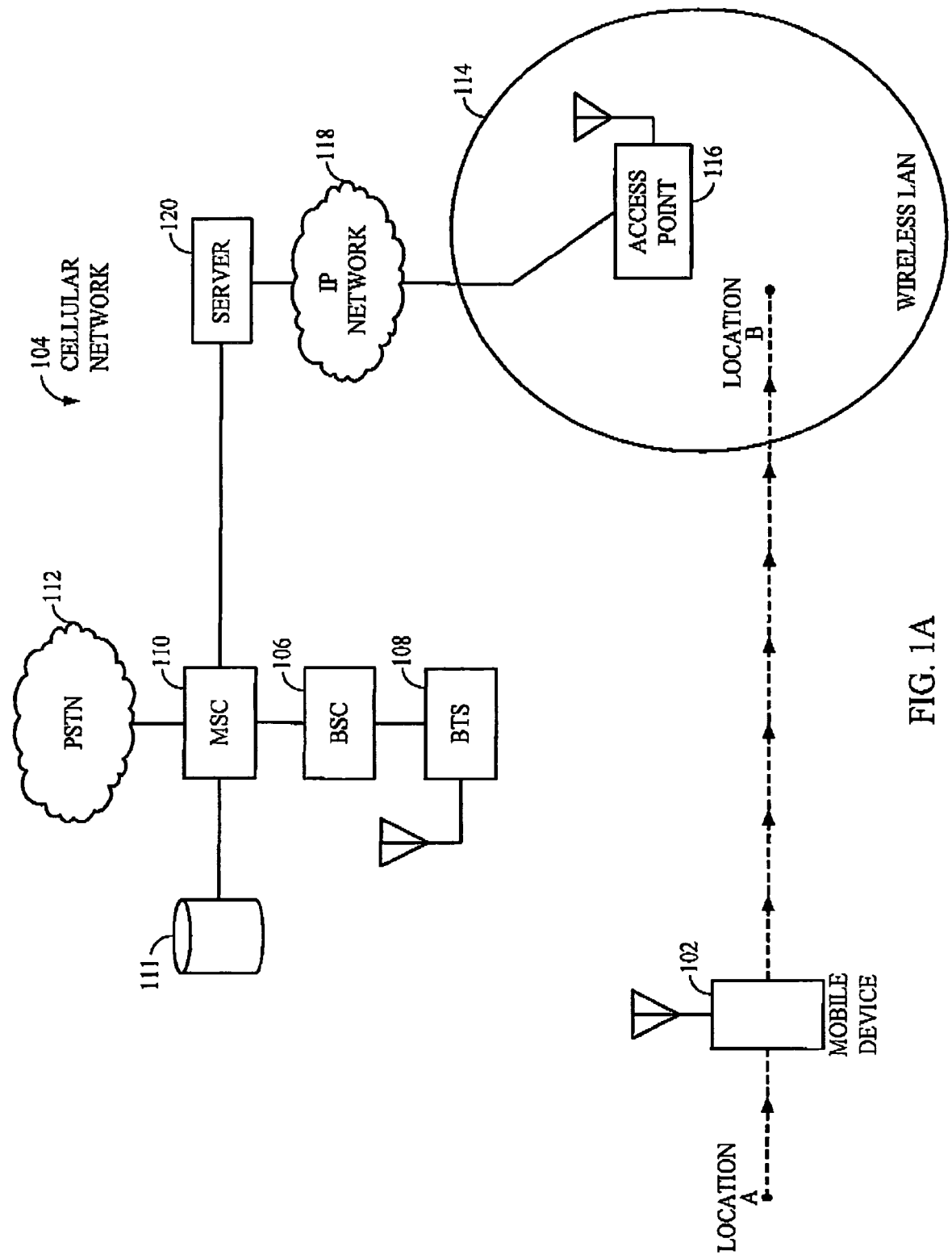
FIG. 1A is a conceptual block diagram of an embodiment of a wireless communications system.

FIG. 1A is a conceptual block diagram of an embodiment of a wireless communications system. A mobile device 102 is shown moving through a wide area cellular network 104 by a series of broken lines. The mobile device 102 can be equipped with wide area wireless connectivity, for example, utilizing the following technologies: third generation wireless or cellular systems (3G), Institute for Electrical and Electronic Engineers (IEEE) 802.16 (WiMax), and other to-be-defined Wireless Wide Area Network (WWAN) technologies. Meanwhile, IEEE 802.11 based Wireless Local Area Network (WLAN) connectivity may be installed in the mobile device 102 as well. Ultra-wideband (UWB) and/or Bluetooth-based Wireless Personal Area Network (WPAN) local connectivity may also be available in the mobile device 102. The cellular network 104 includes a BSC 106 supporting a number of BTSs dispersed throughout the cellular coverage region. A single BTS 108 is shown in FIG. 1A for simplicity of explanation. A mobile switching center (MSC) 110 may be used to provide a gateway to a public switched telephone network (PSTN) 112. Although not shown in FIG. 1A, the cellular network 104 may employ numerous BSCs each supporting any number of BTSs to extend the geographic reach of the cellular network 104. When multiple BSCs are employed throughout the cellular network 104, the MSC 110 may also be used to coordinate communications between the BSCs.

One or more wireless LANs may be dispersed throughout the cellular coverage region of the cellular network 104. A single wireless LAN 114 is shown in FIG. 1A. The wireless LAN 114 may be an IEEE 802.11 network, or any other suitable network. The wireless LAN 114 includes an access point 116 for the mobile device 102 to communicate with an IP network 118. A server 120 may be used to interface the IP network 118 to the MSC 110, which provides a gateway to the PSTN 112.

When power is initially applied to the mobile device 102, it will attempt to access either the cellular network 104 or the wireless LAN 114. The decision to access a particular network may depend on a variety of factors relating to the specific application and overall design constraints. By way of example, the mobile device 102 may be configured to access the wireless LAN 114 when the service quality meets a minimum threshold. To the extent the wireless LAN 114 can be used to support mobile telephony and data communications, valuable cellular bandwidth may be freed up for other mobile users.

The mobile device 102 may be configured to continuously search for a beacon from the access point 116, or any other access point of a wireless LAN. The beacon is a periodic signal transmitted by the access point 116 with synchronization information. In the event that the mobile device 102 cannot detect a beacon, which might be the case if power is applied to the mobile device 102 at location A, then the mobile device 102 attempts to access the cellular network 104. The mobile device 102 may access the cellular network 104 by acquiring a pilot signal from the BTS 108. Once the pilot signal is acquired, a radio connection may be established between the mobile device 102 and the BTS 108 by means well known in the art. The mobile device 102 may use the radio connection with the BTS 108 to register with the MSC 110 (circuit switched network) as well as the IP core network. Registration is the process by which the mobile device 102 makes its whereabouts known to the cellular network 104. When the registration process is complete, the mobile device 102 may enter into an idle state until a call or session is initiated, either by the mobile device 102 or the PSTN 112 or any other entity present in the IP network. Either way, an air traffic link may be established between the mobile device 102 and the BTS 108 to set up and support the call or the session.

When the mobile device 102 moves through the cellular network 104 from location A to location B in the depicted embodiment, it is now able to detect a beacon from the access point 116. Once this occurs, a radio connection may be established between the two by means well known in the art. The mobile device 102 then obtains the IP address of the server 120. The mobile device 102 may use the services of a Domain Name Server (DNS) to determine the server's IP address. The domain name of the server 120 may be delivered to the mobile device 102 over the cellular network 104. With the IP address, the mobile device 102 can establish a registration with a server 120 of an IP core network.

Figure 1B:
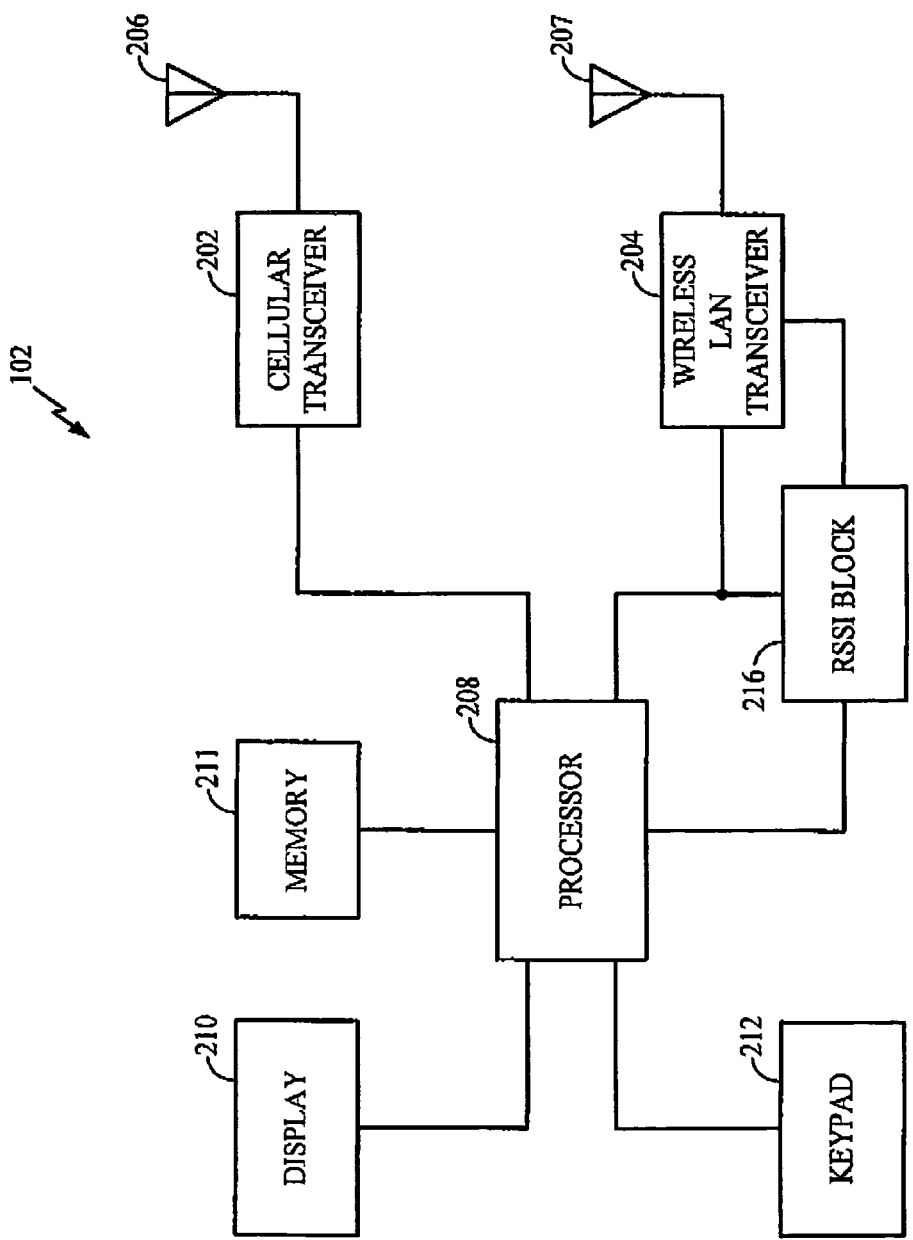
FIG. 1B is a functional block diagram illustrating an example of a mobile device capable of supporting both cellular and wireless LAN communications.

FIG. 1B is a functional block diagram illustrating an example of a mobile device capable of supporting both cellular and wireless LAN communications. The mobile device 102 may include a cellular transceiver 202 and a wireless LAN transceiver 204. In at least one embodiment of the mobile device 102, the cellular transceiver 202 is capable of supporting CDMA2000 1x communications with a BTS (not shown), and the wireless LAN transceiver 204 is capable of supporting IEEE 802.11 communications with an access point (not shown). Those skilled in the art will readily appreciate, however, that the concepts described in connection with the mobile device 102 can be extended to other cellular and wireless LAN technologies. Each transceiver 202, 204 is shown with a separate antenna 206, 207, respectively, but the transceivers 202, 204 could share a single broadband antenna. Each antenna 206, 207 may be implemented with one or more radiating elements.

The mobile device 102 is also shown with a processor 208 coupled to both transceivers 202, 204, however, a separate processor may be used for each transceiver in alternative embodiments of the mobile device 102. The processor 208 may be implemented as hardware, firmware, software, or any combination thereof. By way of example, the processor 208 may include a microprocessor (not shown). The microprocessor may be used to support software applications that, among other things, (1) control and manage access to the cellular network and wireless LAN, and (2) interface the processor 208 to the keypad 210, display, 212, and other user interfaces (not shown). The processor 208 may also include a digital signal processor (DSP) (not shown) with an embedded software layer that supports various signal processing functions, such as convolutional encoding, cyclic redundancy check (CRC) functions, modulation, and spread-spectrum processing. The DSP may also perform vocoder functions to support telephony applications. The manner in which the processor 208 is implemented will depend on the particular application and the design constraints imposed on the overall system. Those skilled in the art will recognize the interchangeability of hardware, firmware, and software configurations under these circumstances, and how best to implement the described functionality for each particular application.

For certain purposes known in the art, the signal strength from the access point may be measured at the mobile device 102 with a received signal strength indicator (RSSI) block 216. The RSSI is most likely an existing signal that is fed back to the wireless LAN transceiver 202 for automatic gain control, and therefore, can be provided to the processor 208 without increasing the circuit complexity of the mobile device 102. Alternatively, the quality of the radio connection may be determined from the beacon.

The processor 208 may be configured to execute an algorithm to register with different access networks. These networks provide a communications path for the delivery of various data services. The algorithm may be implemented as one or more software applications supported by the microprocessor based architecture discussed earlier and stored in the accessible memory 211. Alternatively, the algorithm may be a module separate from the processor 208. The module may be implemented in hardware, software, firmware, or any combination thereof. Depending on the specific design constraints, the algorithm could be integrated into any entity in the mobile device 102, or distributed across multiple entities in the mobile device 102.

Figure 2:
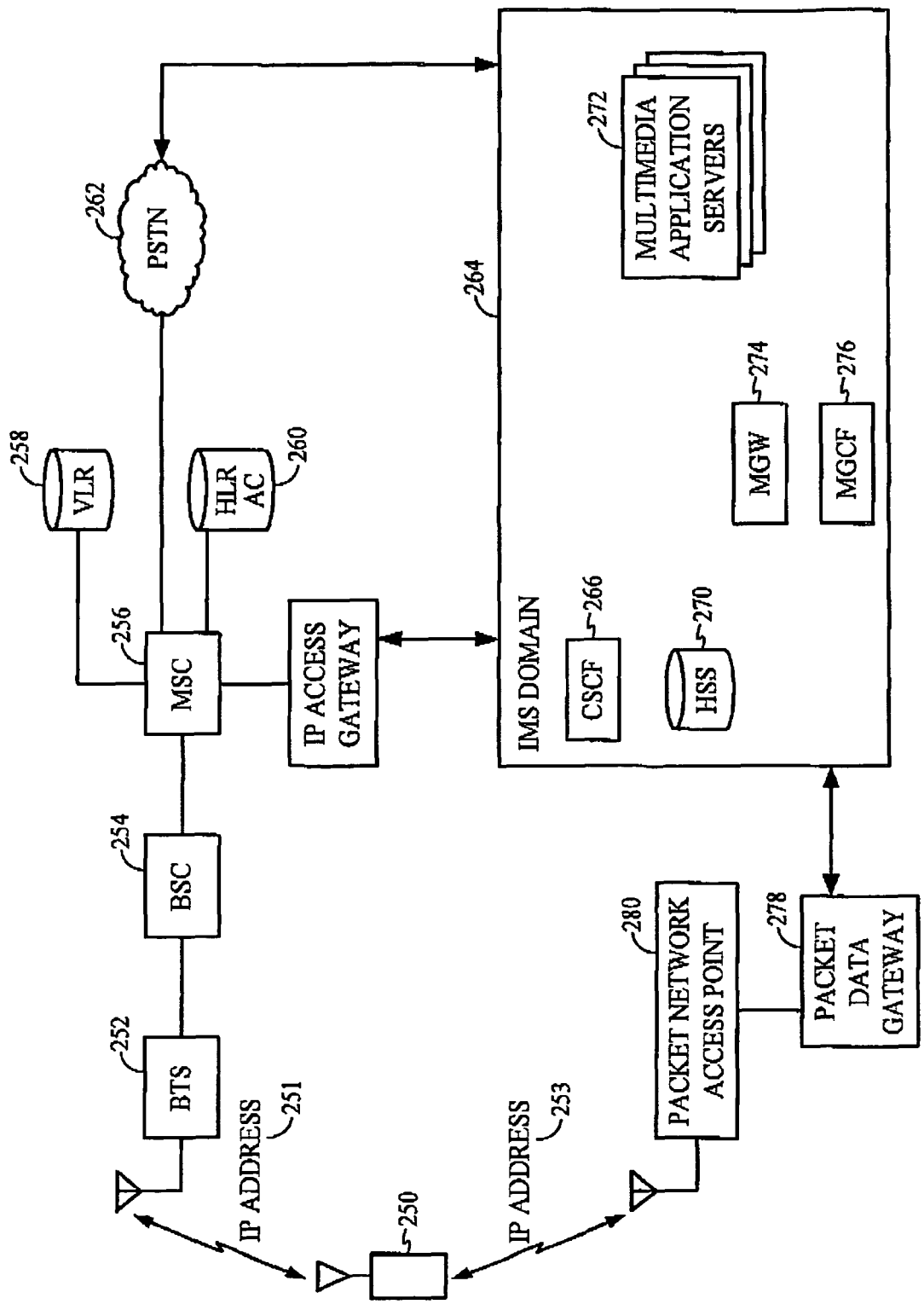
FIG. 2 depicts a conceptual block diagram of a mobile device concurrently registered with two different access networks.

FIG. 2 depicts a mobile device 250 that can communicate with at least two different types of communication networks. An exemplary embodiment of the mobile device 250 may be the mobile device 102 shown in FIG. 1B. In FIG. 2, only two networks are explicitly shown—one is a cellular network and the other is a packet-switched network such as a wireless LAN. Thus, the mobile device 250 may register using an access point 280 to access the IP core network and may register using the cellular network pathway to access the IP core network. As mentioned earlier, other types of networks and various types of technologies are contemplated as well. Accordingly, the mobile device may simultaneously use a variety of different access technologies such as cellular and WLAN to access the IP core network. The IP core network provides variety of IP multimedia services such as voice over IP, video telephony, instant messaging, push to talk, gaming, etc.

Details of IP core network and its connectivity to the different access technologies are illustrated in FIG. 2. The system 120 of FIG. 1A is more comprehensively described as an IP Multimedia Subsystem (IMS) domain 264 as depicted in FIG. 2. The IMS domain has a number of different systems providing the following functions, for example: servers providing IP based services such as SIP servers and SIP registrars (known as Call Session Control Function, CSCF) 266, servers providing interworking with legacy PSTN networks such as MGCF 276 and MGW 274, servers providing interworking with CS cellular networks such as VCC AS (not shown). Also, a plurality of multimedia Application servers 272 can be included that provide different services to the mobile device 250. it is these different application servers 272 that provide a variety of services to the mobile device 250 using either the cellular network, the wireless LAN, or both.

The specific servers identified in FIG. 2 are exemplary in nature and fewer or more servers can be included without departing from the scope of the present invention. In general, one function of the IMS domain 264 is that of mapping signaling and voice communications between the packet-switched network and a circuit-switched network to thereby permit communications between the two. The IMS domain 264 may, for example, provide a SIP based network connection for a mobile device 250. The Session Initiation Protocol (SIP) is a signaling protocol used for establishing sessions in an IP network. A session could be a simple two-way telephone call or it could be a collaborative multi-media conference session. The ability to establish these sessions means that a host of innovative services become possible, such as voice-enriched e-commerce, web page click-to-dial, Instant Messaging with buddy lists, and IP Centrex services. Some other aspects illustrated by FIG. 2 are the inclusion of the HSS server 270 which is the home subscriber server and serves the same function as the HLR in legacy circuit switched networks; and the connection between the PSTN 262 and the IMS domain 264.

The other cellular network elements in FIG. 2 have been described previously such as the BTS 252, the BSC 254, the MSC 256, the VLR 258, the HLR/AC 260 and the PSTN 262. The mobile device 250 can access both the cellular network or a packet switched network, such as a wireless LAN, using the packet data gateway 278 and a packet network access point 280.

In particular, the IMS domain may include a media gateway 274 that converts transmissions between a packet stream from the IP network and the a voice circuit-switched network such as the PSTN 262. Thus, voice is carried in packets over the packet-switched network and the media gateway 274, while voice is carried over voice encoded communication circuits in a circuit-switched connection between the media gateway 274 and the PSTN 262. A media gateway control function (MGCF) 276 is also provided that operates to terminate SIP signaling and control functions of the media gateway 274. In this regard, the MGCF 276 typically performs conversion between SIP signaling in the IP session and SS7 signaling in the circuit-switched session.

While the wireless LAN network is conventionally a packet-switched network requiring a network address such as an IP address, the services now available over many cellular networks may require an IP address as well. For example, instant messaging, voice-over-IP, short message service, push-to-talk, and video sharing are all packet data services that are now available over cellular networks in addition to more traditional IP networks, whether wireless or wired. In FIG. 2, the wide variety of available services are provided by the application servers 272 as well as by other components in the IMS domain. Some of these services pass through the media gateway 274 to be delivered to the mobile device 250 over the wireless LAN or the cellular network and some of these services can be provided without the participation of the media gateway 274. The media gateway 274 may, for example, provide a SIP based network connection for the mobile device. The Session Initiation Protocol (SIP) is a signaling protocol used for establishing sessions in an IP network. A session could be a simple two-way telephone call or it could be a collaborative multi-media conference session. The ability to establish these sessions means that a host of innovative services become possible, such as voice-enriched e-commerce, web page click-to-dial, Instant Messaging with buddy lists, and IP Centrex services.

When the user of the mobile device 250 first accesses one of the application servers 272, that user registers through the media gateway 274 using a public identifier so that an IP address 251 is associated with that public ID. Conventionally, if the user of the mobile device 250 then wants to access data services through another network connection, then the first IP address association is terminated and the user registers that public ID with the different network such that a second IP address 253 now becomes associated with the public ID. The public ID may be any of a variety of formats without departing from the scope of the present invention. However, one exemplary format for the public ID resembles an universal resource indicator (URI) address such as User_name@network.com. Another public ID may resemble a conventional phone number or similar identified. Because the media gateway 274 is providing the IP network access, it maintains a list or table of which public ID is associated with which IP address.

Figure 3:
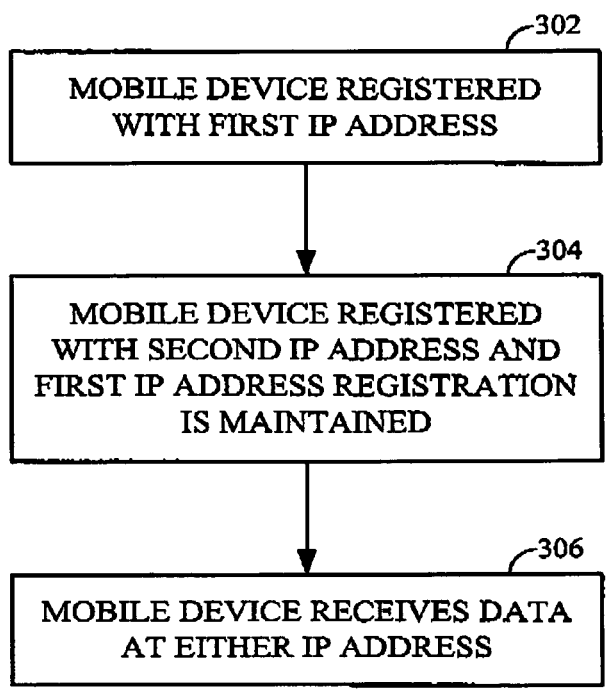
FIG. 3 depicts a flowchart of an exemplary method for concurrently registering a mobile device with at least two different access networks.

FIG. 3 depicts a flowchart of an exemplary method that differs significantly from the conventional behavior just described. First, in step 302, the mobile device is registered over one of the networks and is assigned a first IP address. For example, if the mobile device is within range of a wireless LAN access point, then the mobile device performs the traditional registration and receives its IP address. At that time or when the user of the mobile accesses one or more of available data services, the public ID of the user of the mobile device is then associated with that IP address. This public ID may be manually entered by the user as part of the initial registration process or it may be stored in a memory of the mobile device and automatically retrieved during registration.

Next, in step 304, the mobile device is used to access a different type of network such as, for example, a W-CDMA cellular network providing one or more packet data services. When the user of the mobile device registers with this network, a different range of IP addresses is available. Instead of terminating the first IP address association, it is maintained and a second concurrent registration occurs such that a second IP address is also associated with that same public ID. As a result, in step 306, data services may be delivered to the mobile device using either one of the IP addresses. In other words, the registration of the two different IP addresses with the same public ID associated therewith are active at the same time.

Part of what uniquely identifies a user and a device can be referred to as a user credential. These credential may include a variety of information. For example, a user credential may include the public ID, a private ID, home network domain URI and authentication data (e.g., a key and/or secret). Using these credentials, the mobile device and network can negotiate registration of the device with the network. The user credentials may also include information related to the services to which the user has subscribed and what networks the user can access. The user credentials may be stored within the phone in a rewritable memory or in a removable memory that can be inserted in different mobile devices. In implementing the method of FIG. 3, the same user credentials are used for each of the multiple IP registrations that occur. The user of the mobile device may, of course, manually de-register the association with the first IP address if desired.

This approach of having two IP addresses associated with the same public ID provides a number of benefits. Three particular use cases are described below as examples, others are contemplated as well although not explicitly described.
Continuity of Services:

Streaming data services such as, for example, a video sharing application, highlight the impact of changing IP addresses when moving from one communications network to another. Other services have similar problems but delivery of streaming data is particularly degraded. A user of a mobile device may be under wireless LAN coverage and is accessing streaming video data. If this user then moves out of the wireless LAN coverage into an area only serviced by a cellular network, then the IP address assigned to the mobile device is changed. This requires the user of the mobile device to re-register with the server (e.g., the media gateway) providing access to the streaming video data. Using the method of FIG. 3, however, the user would not have the streaming video interrupted by the need to re-register. Instead, the user of the mobile device could have two IP addresses associated with their identity with one being used to provide data over the cellular network and the other being used to deliver data over the wireless LAN. Whenever movement of the mobile device caused one of the IP addresses to no longer be useful, the data could continue being delivered using the second IP address.
Preferred Access:

If only one IP address can be associated with a user at one time, then the user will necessarily receive all services using that IP address. There may be some instances in which the user prefers to receive certain services over one type of network and other services over a different type of network. For example, the bandwidth available for data transmission within the different types of networks may be different, such that a user would prefer to receive high-bandwidth services over a particular network. Also, the cost of using the different networks may vary such that a user would prefer to use a wireless LAN for certain services instead of a cellular network. Accordingly, when the method of FIG. 3 is implemented, the user of a mobile device may be concurrently registered with at least two different networks (possibly more). This allows the user the ability to register for certain services using one network and certain services using the other network. Data from those services would then be delivered to the appropriate IP address and, thereby, use the type of network which the user prefers. Reasons for preferring one network over another can depend on a number of factors such as bandwidth, coverage area, power usage, billing model, and whether or not data is optimized for a particular network.

In the previous example and description, the user is often described as the party that determines which access network to use. The registering of IP addresses may also occur under the control of the network operator. For example, the mobile device may automatically be registered with an IP address as soon as it enters the coverage area of, for example, a W-CDMA cellular network without any input from the user. Furthermore, if the network operator wants to free some capacity within the cellular network, then some voice calls could be transferred to VoIP using the Wireless LAN without the user knowing of the transfer.

Simultaneous Services:

With the method of FIG. 3, a user of a mobile device may simultaneous use different services. For example, a push-to-talk service may be accessed over the cellular network and a video streaming service accessed over a wireless LAN. In this scenario then, the user could watch a video while simultaneously talking about it to some other user (who may be watching the video themselves).

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the language claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for communicating respective media over multiple access networks, comprising:
    registering a user associated with a device with a media gateway of an IP core network using a first IP address over a first access network using a user credential;
    registering the user with the media gateway of the IP core network using a second IP address over a second access network using the same user credential while maintaining the registration of the first IP address with the user credential; and
    receiving at least one first service from the IP core network via the first access network based on the registration of the user with the media gateway using the first IP address while simultaneously receiving at least one second service from the IP core network via the second access network based on the registration of the user with the media gateway using the second IP address, wherein the at least one first service is a type of service that is different from the at least one second service.

2. The method of claim 1, wherein the first access network and the second access network comprise different types of networks, wherein registering with the first access network further comprises registering with one of a wireless local area network or a cellular network, and wherein registering with the second access network further comprises registering with the other of the wireless local area network or the cellular network.

3. The method of claim 1, wherein registering using the user credential further includes registering using at least one of a public identity, a private identifier of the user, and authentication data, or a combination thereof.

4. The method of claim 1, wherein registering using the user credential further includes registering using information related to service subscriptions for the user included with the user credential.

5. The method of claim 1, further comprising:
    identifying a plurality of services to access; and registering to receive different ones of the plurality of services from a selected one of the first access network and the second access network based on each identified one of the plurality of services.

6. The method of claim 5, wherein the selected one of the first access network and the second access network is based on one or more attributes of the first access network.

7. The method of claim 5, wherein the selected one of the first access network and the second access network is based on one or more attributes of the second access network.

8. The method of claim 5, wherein the selected one of the first access network and the second access network is based on one or more attributes of the identified one of the plurality of services.

9. The method of claim 5, wherein the plurality of services comprise a first data service associated with the first access network and a second data service associated with the second access network, wherein the first data service and the second data service are different types of data services.

10. The method of claim 9, wherein the first data service is one of VoIP, short message service, video sharing, and push-to-talk.

11. The method of claim 9, wherein the second data service is one of VoIP, short message service, video sharing, and push-to-talk.

12. The method of claim 1, further comprising registering to receive different ones of a plurality of services from a selected one of the first access network and the second access network based on whether or not media is optimized for the respective access network.

13. The method of claim 1, further comprising receiving at least one of first data corresponding to the first service from the first access network or second data corresponding to the second service from the second access network.

14. The method of claim 13, wherein receiving the first data or the second data further comprises simultaneously receiving both the first data and the second data.

15. The method of claim 1, wherein the at least one first service is a push-to-talk type service and the at least one second service is a video streaming type service.

16. The method of claim 1, further comprising selectively registering to receive a first set of services from the first access network based on one or more decision factors, and a second set of services from the second access network based on one or more of the decision factors, such that the first set of services is registered to be received from the first access network and the second set of services is registered to be received from the second access network, wherein the first set of services comprises types of services that are different from those of the second set of services, and wherein the one or more decision factors include at least one of a power usage associated with receiving a respective service from a respective access network, a billing model associated with receiving a respective service from a respective access network, a bandwidth associated with a respective access network, and a coverage area associated with a respective access network.

17. A mobile communications device for communication respective media over multiple access networks, comprising:
a first transceiver configured for communication with a first access network;
a second transceiver configured for communication with a second access network;
a user credential;
a processor configured to execute instructions to:
transmit the user credential to the first access network to register a user associated with a first IP address with a media gateway of an IP core network over the first access network using the user credential;
transmit the user credential to the second access network to register the user with a second IP address with the media gateway of the IP core network over the second access network using the same user credential while maintaining the registration of the first IP address with the user credential; and
receive at least one first service from the IP core network via the first access network based on the registration of the user with the media gateway using the first IP address while simultaneously receiving at least one second service from the IP core network via the second access network based on the registration of the user with the media gateway using the second IP address, wherein the at least one first service is a type of service that is different from the at least one second service.

18. The device of claim 17, wherein the first access network and the second access network comprise different ones of a wireless local area network and a cellular network.

19. The device of claim 17, wherein the user credential includes at least one of a public identity, a private identifier of the user, and authentication data, or a combination thereof.

20. The device of claim 17, wherein the user credential includes information related to service subscriptions for the user.

21. The device of claim 17, further comprising a memory accessible by the processor, wherein the user credential is stored the memory.

22. The device of claim 21, wherein the memory is detachable from the device.

23. The device of claim 17, further comprising selectively registering to receive different ones of a plurality of services from a selected one of the first access network or the second access network according to a decision factor comprising whether or not media is optimized for the respective access network.

24. The device of claim 17, further comprising at least one of the first transceiver receiving first data corresponding to the first service from the first access network or the second transceiver receiving second data corresponding to the second service from the second access network.

25. The device of claim 24, wherein the first transceiver and the second transceiver simultaneously receive the first data and the second data.

26. The device of claim 17, wherein the at least one first service is a push-to-talk type service and the at least one second service is a video streaming type service.

27. The device of claim 17, wherein the processor is further configured to execute instructions to selectively register to receive a first set of services from the first access network based on one or more decision factors, and a second set of services from the second access network based on one or more of the decision factors, such that the first set of services is registered to be received from the first access network and the second set of services is registered to be received from the second access network, wherein the first set of services comprises types of services that are different from those of the second set of services, and wherein the one or more decision factors include at least one of a power usage associated with receiving a respective service from a respective access network, a billing model associated with receiving a respective service from a respective access network, a bandwidth associated with a respective access network, and a coverage area associated with a respective access network.

28. A non-transitory computer readable storage media containing programming instructions for communicating respective media over multiple access networks, that upon execution thereof, causes one or more processors of a mobile device to perform the steps of:

registering of a user associated with a device with a media gateway of an IP core network using a first IP address over a first access network using a user credential;

registering the user with the media gateway of the IP core network using a second IP address over a second access network using the same user credential while maintaining the registration of the first IP address with the user credential; and receiving at least one first service from the IP core network via the first access network based on the registration of the user with the media gateway using the first IP address while simultaneously receiving at least one second service from the IP core network via the second access network based on the registration of the user with the media gateway using the second IP address, wherein the at least one first service is a type of service that is different from the at least one second service.

29. The media of claim 28, wherein the first access network and the second access network comprise different types of networks, wherein registering with the first access network further comprises registering with a wireless local area network or a cellular network, and wherein registering with the second access network further comprises registering with the wireless local area network or the cellular network.

30. The media of claim 28, wherein the user credential includes at least one of a public identity, a private identifier of the user, and authentication data, or a combination thereof.

31. The media of claim 28, wherein the user credential includes information related to service subscriptions for the user.

32. The media of claim 28, further comprising identifying a plurality of services to access, and registering to receive different ones of the plurality of services from a selected one of the first access network and the second access network based on each identified one of the plurality of services.

33. The media of claim 32, wherein the selected one of the first access network and the second access network is based on one or more attributes of the first access network, or one or more attributes of the first access network, or one or more attributes of the identified one of the plurality of services.

34. A mobile device for communicating respective media over multiple access networks, comprising:

means for registering a user associated with a device with a media gateway of an IP core network using a first IP address over a first access network using a user credential;

means for registering the user with the media gateway of the IP core network using a second IP address over a second access network using the same user credential while maintaining the registration of the first IP address with the user credential; and means for receiving at least one first service from the IP core network via the first access network based on the registration of the user with the media gateway using the first IP address while simultaneously receiving at least one second service from the IP core network via the second access network based on the registration of the user with the media gateway using the second IP address, wherein the at least one first service is a type of service that is different from the at least one second service.

35. The device of claim 34, further comprising means for identifying a plurality of services to access, and means for selectively registering to receive different ones of a plurality of services from a selected one of the first access network and the second access network based on each identified one of the plurality of services.

36. The device of claim 35, wherein the selected one of the first access network and the second access network is based on one or more attributes of the first access network, or one or more attributes of the first access network, or one or more attributes of the identified one of the plurality of services.

37. The device of claim 34, further comprising means for selectively registering to receive different ones of a plurality of services from a selected one of the first access network or the second access network according to whether or not media is optimized for the respective access network.

38. The device of claim 34, wherein the means for further comprises means for receiving at least one of first data corresponding to the at least one first service from the first access network or second data corresponding to the at least one second service from the second access network.

39. The device of claim 38, wherein the means for receiving the first data or the second data further comprises means for simultaneously receiving both the first data and the second data.

40. A mobile device configured for communicating respective media over multiple access networks, comprising:

a first module for registering a user associated with a device with a media gateway of an IP core network using a first IP address over a first access network using a user credential;

a second module for registering the user with the media gateway of the IP core network using a second IP address over a second access network using the same user credential while maintaining the registration of the first IP address with the user credential; and a third module for receiving at least one first service from the IP core network via the first access network based on the registration of the user with the media gateway using the first IP address while simultaneously receiving at least one second service from the IP core network via the second access network based on the registration of the user with the media gateway using the first IP address, wherein the at least one first service is a type of service that is different from the at least one second service.

41. The mobile device of claim 40, further comprising a fourth module for identifying a plurality of services to access, and a fifth module for selectively registering to receive different ones of a plurality of services from a selected one of the first access network and the second access network based on each identified one of the plurality of services.

42. The mobile device of claim 40, wherein the selected one of the first access network and the second access network is based on one or more attributes of the first access network, or one or more attributes of the first access network, or one or more attributes of the identified one of the plurality of services.

43. The mobile device of claim 40, further comprising a fourth module for selectively registering to receive different ones of a plurality of services from a selected one of the first access network and the second access network according to whether or not media is optimized for the respective access network.

44. The mobile device of claim 40, further comprising a fourth module for receiving at least one of first data corresponding to the at least one first service from the first access network or second data corresponding to the at least one second service from the second access network.

45. The mobile device of claim 44, wherein the fourth module is further for simultaneously receiving both the first data and the second data.

* * * * *